July 5, 1966  H. C. DOENNECKE  3,259,397
WHEEL SUSPENSION MOUNTING
Filed Jan. 17, 1964  3 Sheets-Sheet 1

INVENTOR
Henry C. Doennecke

William S. Dorman
ATTORNEY

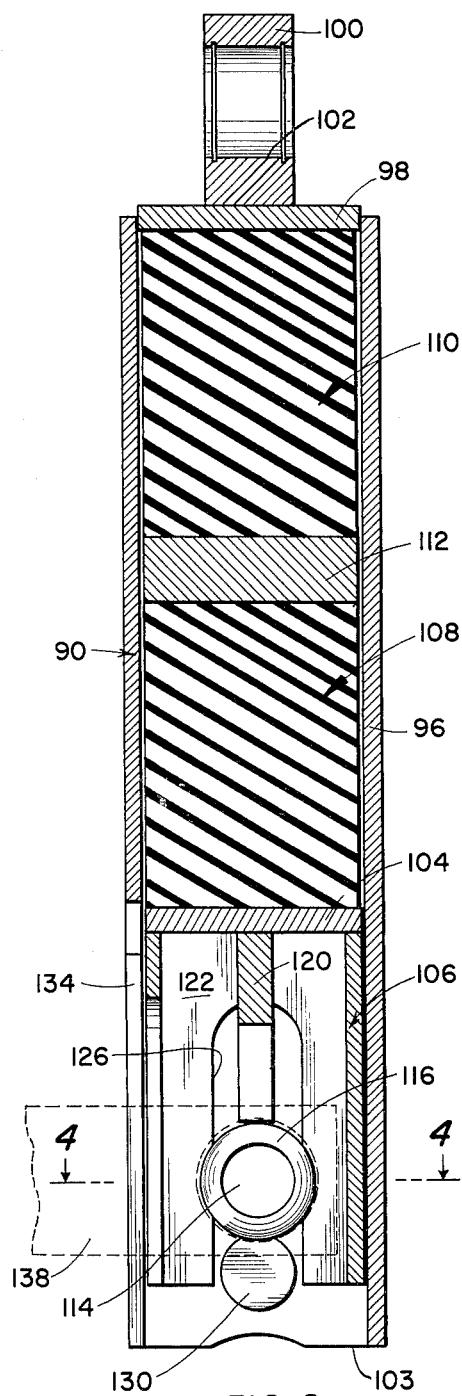
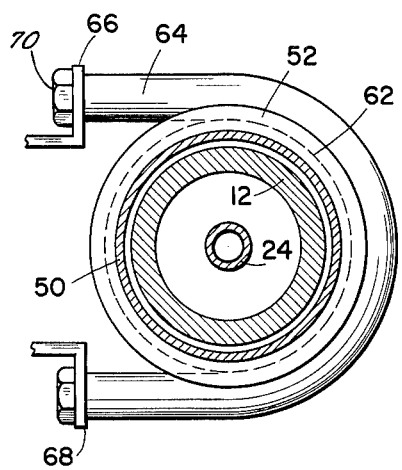
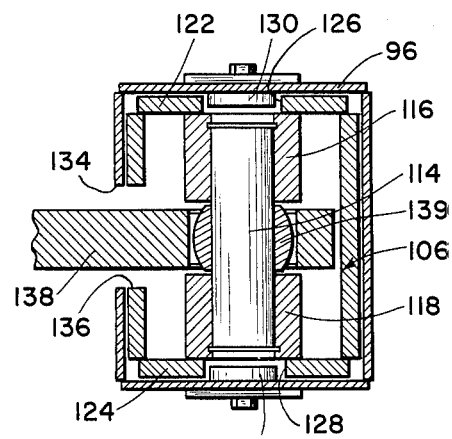

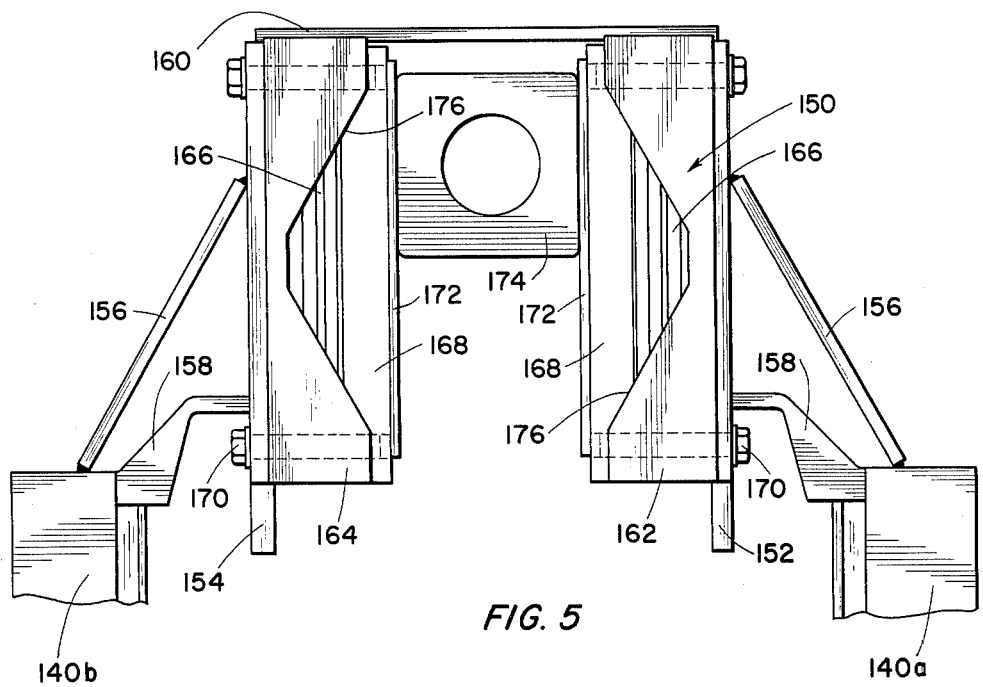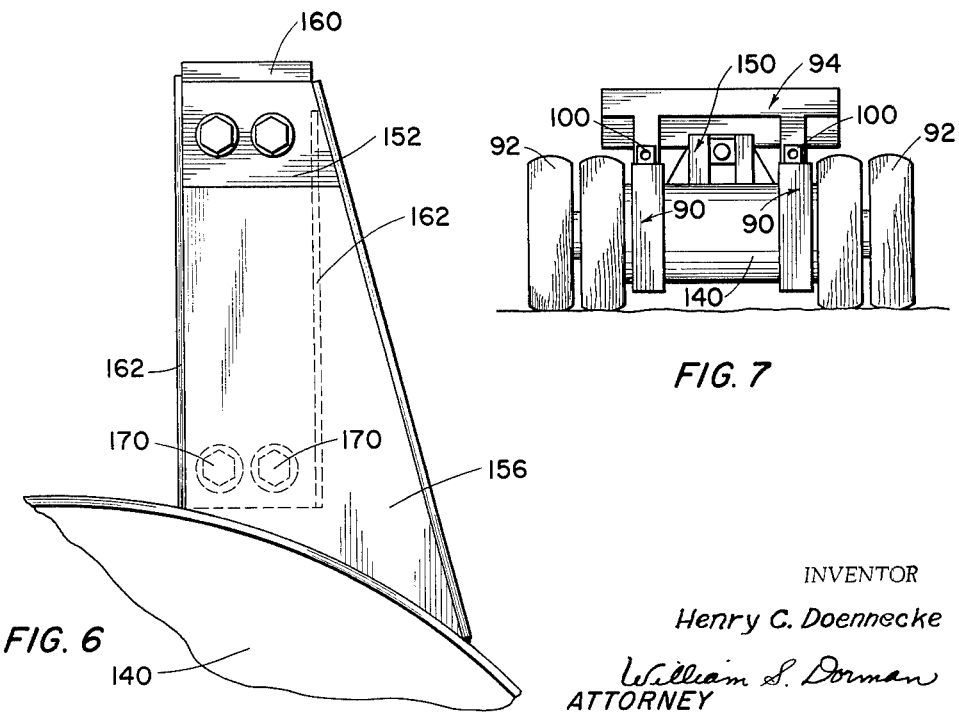

United States Patent Office 3,259,397
Patented July 5, 1966

3,259,397
WHEEL SUSPENSION MOUNTING
Henry C. Doennecke, Tulsa, Okla., assignor to Unit Rig
& Equipment Company, Tulsa, Okla., a corporation of
Delaware
Filed Jan. 17, 1964, Ser. No. 338,459
4 Claims. (Cl. 280—96.2)

This invention relates to improvements in suspension devices and more particularly, but not by way of limitation, to a shock absorbing or suspension mounting arrangement for vehicles wherein resilient members are utilized in lieu of fluid cylinder devices, thus eliminating the need for fluid seals, and the like, and providing an increased operating performance.

Most vehicles of today are provided with suspension systems utilizing spring devices or hydraulic cylinders for absorbing the shock as the vehicle is driven or moves throughout its course of travel. The spring devices have certain disadvantages, particularly in utilization with large vehicles, such as off-highway type trucks and the like, in that the tremendous loads encountered and impressed on the devices frequently damage the springs whereby they must be replaced. Those suspension systems utilizing hydraulic cylinders, and the like, normally utilize fluids in the operation thereof and as a result, fluid seals are required to preclude leakage of the hydraulic fluids from the system and maintain an efficient operation. These fluid seals frequently fail to maintain a sufficient fluid seal and are usually very expensive in constructions. Furthermore, as a practical matter, the shock absorbing performances of the presently available spring devices as well as the reciprocal piston or plunger structures do not provide a sufficiently smooth ride for the operator of these exceptionally large off-highway vehicles. The resulting rough ride is not only uncomfortable, but may be hazardous to the driver of the equipment.

The present invention contemplates a novel shock absorbing or suspension mounting system for vehicles which is particularly designed and constructed for eliminating the use of springs and hydraulic cylinders and the inherent disadvantages thereof. The novel suspension mounting arrangement provides a plurality of superimposed resilient members disposed within a housing in such a manner as to efficiently absorb the shock as the vehicle is driven along a highway or across rough terrain. The shock absorption performances of the novel suspension mounting have proven extremely efficient and actually provide as smooth a ride for the operator of the equipment which compares favorably with a ride in a passenger vehicle. In addition, the novel suspension means may be adapted for reducing lateral jarring or shock in the vehicle during operation thereof. The novel shock absorbing means is simple and efficient in operation and economical and durable in construction.

It is an important object of this invention to provide a novel shock absorbing system for a vehicle particularly designed and constructed for increased operating results.

It is another object of this invention to provide a novel shock absorbing or suspension mounting system for vehicles so constructed to eliminate the necessity of hydraulic cylinders, and the like, thus eliminating the need for fluid sealing devices.

Still another object of this invention is to provide a novel suspension mounting system for relatively large vehicles utilizing a plurality of resilient shock absorbing members which provide greatly increased shock absorbing performance during the operation of the vehicle.

Still another object of this invention is to provide a novel suspension mounting for off-highway type vehicles wherein the shock absorbing performance is sufficiently efficient for providing a smooth ride for the operator of the vehicle which is comparable to that attainable in a passenger vehicle.

A further object of this invention is to provide a novel suspension mounting which may be arranged in a manner for absorbing both vertical shocks and lateral shocks encountered during the operation of a vehicle.

Other and further objects and advantageous features of the present invention will hereinafter more fully appear in connection with a detailed description of the drawings in which:

FIGURE 2 is a sectional elevational view of a rear wheel suspension mounting embodying the invention.

FIGURE 3 is a sectional view taken on line 3—3 of FIGURE 1.

FIGURE 4 is a sectional view taken on line 4—4 of FIGURE 2.

FIGURE 5 is a front elevational view of a suspension mounting embodying the invention and for absorbing lateral movement in a vehicle FIGURE 6 is an end elevational view of the suspension mounting depicted in FIGURE 5.

FIGURE 7 is a schematic view in reduced scale depicting the lateral suspension mounting of FIGURE 5 in association with a vehicle.

Front suspension mounting

Figure 1:
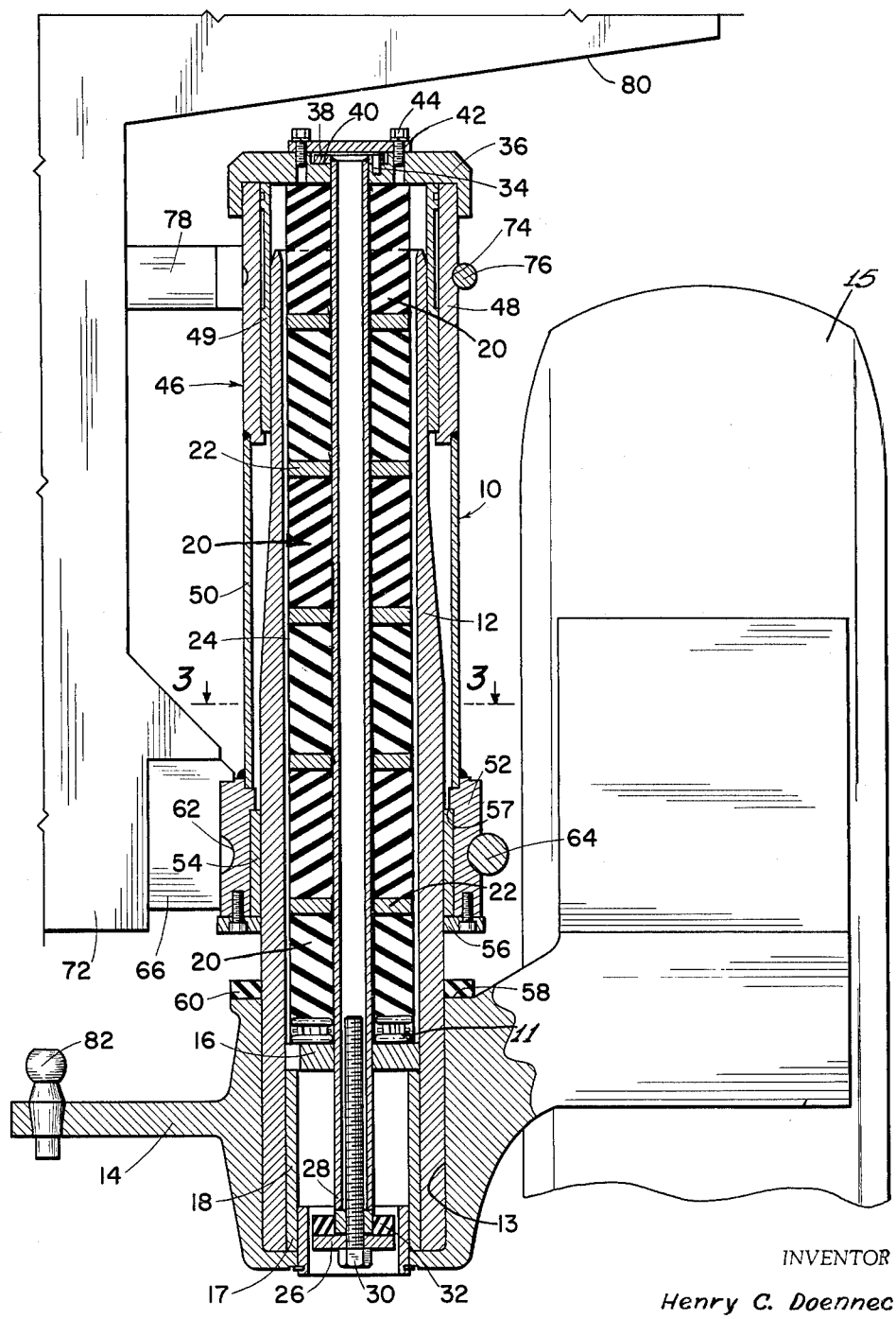
FIGURE 1 is a sectional elevational view of a front wheel suspension mounting embodying the invention and shown in relationship to portions of a vehicle.

Referring to the drawings in detail, and particularly to FIGURES 1 and 3, reference character 10 generally indicates a front suspension mounting device comprising a main or inner housing member 12 which is preferably of substantially cylindrical configuration, but not limited thereto. The sleeve or housing 12 is disposed in or carried by a strut 14 which may be of any suitable type normally utilized for supporting a vehicle wheel 15, particularly the type utilized in relatively large or off-highway vehicles wherein at least the front wheel members thereof are usually independently mounted with respect to the vehicle (not shown). The sleeve 12 is preferably a shrink fit within a bore 13 of the strut 14, or otherwise suitably secured thereto, whereby the sleeve 12 and strut 14 will move as a unit, as will be hereinafter set forth.

An annular support member 16 is disposed within the housing 12 and is preferably spaced from the lower end 17 thereof, as viewed in FIGURE 1, by a suitable spacer sleeve 18. A plurality of groups or sets of resilient members or rubber pads, generally indicated at 20, are stacked or superimposed within the sleeve 12 with the lowermost group 20 supported on the member 16. It is preferable to provide a rigid annular spacer member 22 between each adjacent group of resilient members 20 for facilitating the support of the groups or sets within the sleeve 12. A centrally disposed centering rod 24 extends longitudinally through the sleeve 12 and extends through the groups of pads 20, as clearly shown in FIGURE 1. The rod 24 functions as a guide and centering member for the resilient pads 20 during operation of the suspension mounting device 10, as will be hereinafter set forth.

It is anticipated that a suitable bearing such as a thrust bearing 11, or the like, may be disposed on the support plate 16 for receiving the lowermost set of pads 20 thereon. This thrust bearing may be included in the column of resilient pads 20 to substantially preclude any torsional "wind up" of the column when the front wheels 16 are turned during steering or operation of the vehicle. Of course, it is to be noted tha the thrust bearing may be disposed on substantially any of the spacers 22 or otherwise interposed in the column of resilient pads 20 to provide the same result.

The rod 24 extends through the support member 16 and is slidable with respect thereto. A stop member 26 is secured to one end 28 of the rod 24 in any suitable manner, such as by the stud member 30, for engagement with the support plate 16 to limit the movement of the rod 24 in one direction. An annular resilient member 32 is disposed adjacent the upper surface of the stop member 26 and may be secured thereto in any suitable manner (not shown) for cushioning the shock of the engagement between the support member 16 and stop member 26 when the rod 24 moves upwardly within the sleeve 12 during operation of the device 10.

The upper end 34 of the rod 24 protrudes beyond the upper end of the sleeve 12 and extends through a cap member 36. An outwardly extending flange member 38 is provided on the outer extremity of the rod 24 and is adapted for disposition in a complementary recess 40 provided in the cap member 36 whereby the rod 24 is supported at the upper end by the cap 36. A suitable cover disc 42 is secured to the upper surface of the cap 36 in any suitable manner such as by a plurality of screws 44 for retaining the flange 38 within the bore or recess 40. It will be apparent from an inspection of FIGURE 1 that the cap member 36 is spaced from the upper end of the sleeve 12 in a manner and for a purpose as will be hereinafter set forth.

An outer housing generally indicated at 46 is loosely disposed around the housing 12 and comprises an upper tubular member 48 secured to the cap 36 in any suitable manner (not shown). The tubular member 46 is spaced from the inner sleeve 12 by a suitable bushing 49 whereby the inner sleeve 12 may move both longitudinally and rotatably with respect to the tubular member 46. A sleeve 50 is secured at one end to the tubular member 46 and extends downwardly therefrom to a lower tubular member 52 which is suitably secured to the opposite end thereof. The tubular member 52 is spaced from the inner sleeve 12 by a suitable bushing 54 which cooperates with the bushing 49 to permit relative movement between the inner housing 12 and tubular member 52. An annular ring 56 is removably secured to the outer extremity or lower end of the tubular member 52 for cooperation with an inwardly directed shoulder 57 on the inner periphery of the sleeve 52 for retaining the bushing 54 in position around the outer periphery of the sleeve 12. An annular shoulder 58 is provided on the strut 14 and disposed around the outer periphery of the sleeve 12 below the retaining ring 56 for receiving an annular resilient member 60 to provide a cushioning or bumper action during operation of the device 10 upon longitudinal movement of the housing 12 within the outer housing 46.

The outer housing 46 is preferably rigidly secured to the vehicle, a portion of which is shown in FIGURE 1, and remains stationary with respect thereto. Of course, the outer housing 46 may be secured to the vehicle in any suitable manner and as depicted herein, the upper and lower tubular members 48 and 52, respectively, are strapped to the framework of the vehicle. As more particularly shown in FIGURE 3, an annular groove or recess 62 is provided in the outer periphery of the tubular member 52 for receiving an arcuate strap member 64 therein. The strap member 64 has the opposite ends thereof secured to oppositely disposed flange members 66 and 68 in any suitable manner such as by bolts 70. The flanges 66 and 68 are preferably integral with or rigidly secured to the frame 72 of the vehicle. Thus, the strap 64 may be tightly engaged in the groove 62 for securing the lower portion of the outer housing 46 to the frame portion 72 of the vehicle. The upper sleeve 48 may be similarly secured to the frame portion 72 of the vehicle. An annular groove 74 is provided around the outer periphery of the tubular member 48 for receiving a strap member 76 therein having the opposite ends secured to suitable bracket members 78 (only one of which is shown in FIGURE 1) which in turn is secured to or integral with the vehicle frame portion 72.

Referring particularly to FIGURE 1, the vehicle frame portion indicated at 72 is preferably one portion of the vehicle frame which is disposed in the proximity of the front wheel 15 and the upper portion of the frame 72 preferably extends slightly upwardly and outwardly as shown at 80 whereby a recess or well is provided for substantially encasing the device 10 and portion of the wheel 15. Of course, there is preferably a substantially identical but reverse arrangement provided on the opposite side of the vehicle in the proximity of the other front wheel. The shock absorbing device 10 is interposed between the wheel 16 and the frame 72 and is thus somewhat protected by the overhanging portion 80. In addition, it may be desirable to provide the usual snubber (not shown) for utilization in conjunction with the suspension mounting device 10. However, as a practical matter, it has been found that snubbers are not usually necessary.

Each set of resilient members 20 preferably comprises a plurality of annular resilient pads so arranged as to provide for a maximum of support simultaneously with a maximum of compression. Each pad may comprise a rigid annular main body (not shown) having a resilient upper and lower surface bonded or otherwise secured thereto. The cross-sectional configuration of the resilient surfaces may include longitudinally protruding nodules whereby one pad member is supported or disposed between the outer extremities of the complementary nodules of the adjacent upper and lower pads. Pads of this type are commercially available and provide great strength for support and yet permit a great flexibility in compression.

*Front suspension operation*

For purposes of illustration, it is assumed that the front suspension device 10 is to be utilized with a relatively large, off-highway vehicle (not shown) having a pair of oppositely disposed front wheels 15 (only one of which is shown in FIGURE 1). Each wheel 15 is carried by a strut 14 which is connected with the steering system of the vehicle (not shown) in any well known manner, such as by the ball member 82 and a cooperating socket (not shown). Each strut 14 carries a sleeve 12 having the resilient sets of pads 20 disposed therein. The sleeves 12 are movably disposed within the respective outer housing 46 and the outer housings 46 are rigidly secured to the frame 72 of the vehicle.

As the vehicle moves during the course of travel thereof, the wheels 15 independently jolt or bounce along the surface of the area being traversed, moving the strut 14 simultaneously therewith. In addition, the strut 14 is rotated with respect to the vehicle and in a substantially horizontal plane during steering of the vehicle. This combined "up and down" and rotational movement of the strut is transmitted to the sleeve 12 by virtue of the connection therebetween. The sleeve 12 is thus reciprocated and rotated, either independently or simultaneously, within the outer housing 46. The bushings 49 and 54 facilitate this movement of the sleeve 12 with respect to the housing 46.

The rotational movement of the sleeve 12 within the housing 46 results in a slight twisting of the superimposed stacks of pads 20 within the housing 46 and is absorbed. The rotational movement of the sleeve 12 is thus not transmitted to the outer housing 46.

Upward movement of the sleeve 12 within the housing 46 is limited by the engagement of the retaining ring 56 and cushion member 58. As the sleeve 12 moves upwardly within the housing 46, the support member 16 is moved upwardly therewith along the outer periphery of the rod 24 for compressing the resilient groups or sets of pads 20. This compression of the resilient pads 20 absorbs substantially all of the upward movement of the sleeve 12 whereby relatively little of the upward movement is imparted to the housing 46. The rod 24 functions as a guide for the plate 16 and pads 20 and maintains the pads centered within the sleeve 12 for facilitating the dampening action of the device 10.

Downward movement of the strut 14 carrying the sleeve 12 moves the sleeve 12 downwardly within the housing 46 and causes the support plate 16 to move downwardly therewith along the outer periphery of the rod 24 for releasing the compressive force on the pads 20. The resiliency of the pads permits a return to the substantially normal conformation thereof. The downward movement of the sleeve 12 is limited by the engagement of the plate 16 with the cushion member 32 which is disposed on the stop member 26. The length of downward travel of the sleeve 12 permits an absorption of a great amount of corresponding movement of the strut 14 and wheels 15 without transmitting the movement to the outer housing 46.

It will be apparent that the front suspension mounting device 10 absorbs a great amount of the vertical movements of the wheels 15 of the vehicle during operation thereof. A minimum of bouncing or up and down movement is transmitted to the vehicle and as a result, an extremely smooth ride is provided for the operator of the vehicle or equipment, particularly when the front suspension device 10 is utilized in conjunction with a suspension device adapted for use with the rear wheels of the vehicle as will be hereinafter set forth.

*Rear suspension mounting*

Referring now to FIGURES 2 and 4, a rear suspension mounting device or shock absorber, generally indicated at 90, is particularly designed and constructed for utilization in combination with the rear wheels 92 (FIGURE 7) of the vehicle, the rear portion of which is generally indicated at 94 in FIGURE 7. The rear suspension device 90 comprises an outer housing 96 which may be of cylindrical or rectangular configuration, as desired, and as depicted herein is of rectangular cross-sectional configuration. The upper end of the housing 96 is closed by a suitable plate 98 which may be welded or otherwise secured thereto. A support member or hanger 100 is secured to the upper surface of the plate 98 and is provided with an aperture 102 extending transversely therethrough for connecting the housing 96 with the vehicle 94 in a manner as will be hereinafter set forth.

The lower end 103 of the housing 96 is open and a support plate 104 carried by a housing 106 is slidably disposed within the housing 96 in the proximity of the open end 103. A plurality of superimposed pads, generally indicated at 108, are disposed within the housing 96 and supported on the plate 104. A second group of superimposed resilient pads, generally indicated at 110, is disposed within the housing 96 and spaced from the first group 108 by a suitable spacer member 112. Whereas two groups of pads are depicted herein, it is to be understood that substantially any desired member thereof may be utilized. The groups of pads 108 and 110 may be of any suitable flexible type, such as those disclosed in the front suspension mounting, but not limited thereto.

A shaft 114 extends transversely through the movable housing 106 and is secured therein in any suitable manner, such as by a pair of spaced aligned sleeve members 116 and 118 which are welded or otherwise secured to a centrally disposed U-shaped web member 120 provided within the housing 106. The side walls 122 and 124 of the housing 106 which are disposed adjacent the sleeves 116 and 118 are provided with aligned longitudinally extending slots or recesses 126 and 128, respectively, for receiving oppositely disposed inwardly extending stop members 130 and 132 which are secured within the housing 96. The stop members 130 and 132 cooperate with the slots 126 and 128 for limiting the downward movement of the inner housing 106 with respect to the outer housing 96 as will be hereinafter set forth in detail.

A longitudinally extending slot 134 is provided on one side of the outer housing 96 and extends upwardly from the open end 103 thereof in alignment with a similar longitudinally extending slot 136 provided in the housing 106. An arm member 138, having one end thereof secured to or journalled on the shaft 114 in any suitable manner, such as by a spherical bushing 139, extends radially outwardly from the shaft 114 and through the aligned slots 134 and 136 into connection with the axle structure 140 (FIGURE 7) extending between the rear wheels 92. In this manner, the inner housing 106 and support member 104 carried thereby are rigidly connected or secured to the axle structure 140 for movement simultaneously therewith whereby the housing 106 will be reciprocated within the housing 96 during operation of the vehicle.

Whereas the axle structure 140 shown in FIGURE 7 is a single transversely extending unit, it is to be understood that it may be desirable to provide independent axle structures for the complementary pairs of wheels. In this event, a rear suspension mount 90 will be provided for each axle structure.

*Rear suspension operation*

The rear suspension mounting device 90 is secured to the vehicle in the proximity of the rear wheels 92 thereof for absorbing the shock encountered by the rear wheels during operation of the vehicle. It is preferable to utilize at least two of the devices 90, one being disposed in the proximity of each pair of complementary rear wheels. The outer housing 96 of each device 90 is secured to the rear portion 94 of the vehicle in any suitable manner, such as by a shaft or pin member (not shown), extending through the aperture 102 of the support or hanger member 100. In this manner, the housing 96 moves simultaneously with the vehicle. As hereinbefore set forth, the housing 106 and support plate 104 carried thereby are slidably disposed within the housing 96 and are in rigid connection with the axle 140 of the rear wheels 92 through the arm member 138. Thus, the housing 106 and support plate 104 move simultaneously with the rear wheels and independently from the vehicle itself.

As the vehicle moves throughout its course of travel, the rear wheels fluctuate in accordance with the roughness of the terrain being traversed. Any upward movement of the rear wheels moves the associated housing 106 and support plate 104 upwardly within the housing 96 for compressing the sets or groups of pads 108 and 110. A considerable amount of compression is permitted by the resilient pads in the groups and, thus, substantially all of the vertically upward movement of the wheels is absorbed without transmitting said movement to the vehicle. Conversely, downward movement of the rear wheels moves the housing 106 and support plate 104 downwardly within the housing 96 for releasing the compression pressure on the pads 108 and 110. It will be apparent that substantially all of the downward vertical movement of the wheels will be absorbed without transferring thereof to the vehicle. The oppositely disposed stop members 130 and 132 provided within the housing 96 cooperate with the corresponding slots 126 and 128 of the housing 106 for limiting the downward movement of the housing 106 with respect to the housing 96 and precluding accidental withdrawal of the housing 106 from disposition within the housing 96.

When the vehicle is fully loaded, the weight thereof will be considerably greater than when it is unloaded or partially loaded. The housing 96 will be positioned lower with respect to the housing 106 in the loaded condition of the vehicle, but the compression distance allowable in the groups of pads 108 and 110 is specifically selected whereby even in the fully loaded condition of the vehicle, there is still sufficient compression area or space remaining to assure an efficient operation of the rear suspension device 90.

Lateral suspension mounting

Referring now to FIGURES 5, 6 and 7, a lateral shock absorbing or suspension mounting device, generally indicated at 150, is depicted which is adapted for providing a resilient or yielding support between the vehicle and the rear wheels thereof in lieu of the usual leaf springs (not shown) and the like, normally utilized in vehicles of this type. The lateral suspension mounting device is preferably mounted on the outer periphery of the axle 140 extending between the rear wheels 92 of the vehicle and extends upwardly therefrom substantially centrally disposed between the wheels as shown in FIGURE 7.

The lateral suspension device 150 comprises a pair of spaced plate members 152 and 154 secured to or supported by the axle structure 140 in any suitable manner. As depicted herein, an angularly disposed web or plate 156 may extend between each plate 152 and 154 and the axle structure 140 and is preferably welded or otherwise rigidly secured therebetween. In the event the axle structure 140 comprises two individual axle members, as hereinbefore set forth, the plate 152 may be secured to one of the axles 140a (FIGURE 5) and the plate 154 may be secured to the other axle 140b. In addition, a suitable support bracket 158 may be secured between the plates 152 and 154 and the respective axle members 140a and 140b.

A cover or top member 160 is secured between the upper ends of the plates 152 and 154. A pair of spaced inwardly directed side plate members 160 are secured to the inner surface of the plate 152 and a pair of similar side plates 164 (only one of which is shown in FIGURE 5) are provided on the inner surface of the plate 154. A bottom plate (not shown) is secured between each of the complementary pairs of side plates 162 and 164 thus providing a pair of oppositely disposed chambers for receiving a plurality of flexible pad members 166 therein.

A compression member 168 is disposed adjacent the exposed surface of the outermost pad 166 in each of the said chambers and a plurality of spaced stud or guide members 170 extend through each plate 152 and 154 and the associated chamber and respective compression member 168 whereby each compression member 168 may move back and forth within its respective chamber for alternately compressing and releasing the pressure on the pads 166 in association therewith. It is preferable that the pads 166 be in a pre-compressed condition at a preselected compression pressure and this may be accomplished in any suitable manner (not shown).

A wear plate or bearing plate 172 is suitably secured to the exposed surface of each compression member 168 for slidably receiving an aperture block member 174 therebetween. The apertured block 174 may be of any suitable type and configuration and is secured to the rear portion 94 of the vehicle in any well known manner, such as by a shaft (not shown) extending through the apertured block 174 and suitably secured thereto. The block 174 is thus movable simultaneously with the vehicle and is slidable with respect to the plates 172 upon relative movement between the vehicle and the rear wheels 92. The side plates 162 and 164 are preferable relieved, as shown at 176 in FIGURE 5, for ease of installation and removal of the pads 166 from the respective chambers.

Lateral suspension operation

The lateral suspension device 150 may be secured to the axle structure 140, as hereinbefore set forth, whereby the entire device moves simultaneously with the rear wheels 92 of the vehicle. The block 174 is disposed between the wear plates 172 and in turn is secured to the rear portion 94 of the vehicle. During operation of the vehicle, the vehicle usually oscillates in a lateral direction independently of the wheels. This action causes the block 174 to move in a lateral direction and thus bears against one of the plates 172 with greater force than against the other of said plates 172. One set of pads 166 will thus be compressed with a greater force than the other set of pads for absorbing substantially all of the lateral motion of the vehicle without transmitting this lateral movement to the rear wheels 92.

Of course, any vertical variations of movement between the vehicle and the rear wheels will cause the block member 174 to ride vertically between the plate members 172. It will be apparent that there is thus no transmission of vertical movements between the vehicle and the rear wheels. It will be further apparent that the block 174 is limited in its movement in one direction by the top member 160 and is limited in its movement in an opposite direction by the axle structure 140.

As the vehicle oscillates or moves from side to side laterally with respect to the wheels, first one compression plate 168 is moved by the block 174 for compression of the respective pads 166 and then the other of said compression plates 168 is moved against the respective pads 166. The resiliency of the pads absorbs substantially all of the lateral movement of the vehicle with respect to the wheels, or conversely, of the wheels with respect to the vehicle.

Summary

The present invention provides novel supporting or suspension devices for utilization with a vehicle, particularly a relatively large vhicle, wherein a plurality of complementary resilient compression members or pads are utilized for absorbing relative motion between various components of the vehicle. The front suspension mounting device is preferably of a cylindrical configuration wherein absorption is provided for both vertical fluctuations and rotational variances of the wheels and frame of the vehicle. The rear suspension structure normally does not require rotational compensation and is accordingly particularly constructed for absorbing vertical fluctuations between the rear wheels and the vehicle itself. A similar application of flexible pad members is utilized to compensate for or absorb lateral variations of movement, particularly between the rear wheels and the vehicle.

As a practical matter, it has been found in a large vehicle of the off-highway type that a combination of suspension devices utilizing the principle disclosed herein provides a smooth ride for the operator of the equipment which is comparable to the ride attainable in a passenger vehicle. Thus, the overall operation of the vehicle is greatly facilitated by providing an ease of driving and riding for the operator thereof.

From the foregoing, it will be apparent that the present invention contemplates a novel suspension or shock absorbing structure for vehicles utilizing a plurality of resilient members in combination for absorbing substantially all shock or movement variances between the wheels of a vehicle and the frame work thereof. The novel suspension devices embodying the invention are simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A suspension mounting device for a wheeled vehicle comprising an outer housing carried by the vehicle, a inner housing carried by a wheel, said inner housing being slidably and rotatably disposed within the outer housing, a support member secured to the inner housing and spaced upwardly from the lower end thereof, a plurality of superimposed resilient pad members disposed within the inner and outer housings and supported above the support member, said resilient pad members being alternately compressible and expandable upon relative longitudinal movement between the inner and outer housings for absorbing substantially all of the relative longitudinal movement therebetween, means interposed between the resilient pad members for precluding torsional wind up thereof during relative rotational movement between the inner and outer housings, centering means carried by the outer housing and extending through the inner housings and resilient pads for guiding and centering thereof during operation of the suspension mounting device, said centering means comprising a longitudinally extending member having one end secured to the outer housing and opposite end extending slidably through and beyond the support member, stop means carried by the said opposite end of the longitudinally extending member and spaced from the support member for providing relative longitudinal movement between the inner and outer housings in one direction while precluding a complete separation thereof in said one direction.

2. A suspension mounting device for a wheeled vehicle comprising an outer housing carried by the vehicle, an inner housing carried by the wheels and being slidably and rotatably disposed within the outer housing, a support member disposed within the inner housing, a plurality of superimposed resilient pad members disposed within the inner and outer housings and supported by the support member, a centrally disposed guide member extending longitudinally through the inner and outer housings and carried by the outer housing, means disposed around the guide member and interposed between the resilient pad members for precluding torsional wind up of the pad members during relative rotational movement between the inner and outer housings, said resilient pad members being alternately compressible and expandable upon relative longitudinal movement between the inner and outer housings for absorbing substantially all the relative movement therebetween, means carried by the guide member for limiting the relative longitudinal movement between the inner and outer housings in one direction, and means for limiting and cushioning relative longitudinal movement between the inner and outer housings in an opposite direction.

3. A suspension mounting for a wheeled vehicle comprising an outer housing carried by the vehicle, an inner housing carried by a wheel and being slidably and rotatably disposed within the outer housing, a plurality of spaced bushings interposed between the inner and outer housings for facilitating relative rotational and longitudinal movement therebetween, a support member disposed in the inner housing, a plurality of superimposed resilient pad members disposed within the inner and outer housings and supported above the support member, a closure member disposed on one end of the outer housing, said inner housing being open at both ends thereof, a centrally disposed guide member carried by the closure member, said guide member extending longitudinally through the pad members and support member and slidable with respect thereto, stop means carried on the outer extremity of the guide member and spaced from the support member for permitting relative longitudinal movement between the inner and outer housings and precluding a complete separation therebetween in one direction, means disposed around the guide member and interposed between the resilient pad members for precluding torsional wind up of the pad members during relative rotational movement between the inner and outer housings, and said resilient pad members being alternately compressible and expandable upon relative longitudinal movement between the inner and outer housings for absorbing substantially all the relative movement therebetween.

4. A suspension mounting device for a wheeled vehicle and comprising an outer housing rigidly secured to the vehicle, an inner housing slidably and rotatably disposed within the outer housing and rigidly secured to a wheel strut for independent movement of the wheel strut with respect to the vehicle, bushing means spaced between said inner and outer housings to facilitate relative movement therebetween, support means disposed within the inner housing, a plurality of yielding pad members disposed within the outer and inner housings and supported by the support means and the outer housing, said yielding pad members being alternately compressible and expandable upon relative longitudinal movement of said inner housing inwardly and outwardly, respectively, in relation to said outer housing for absorbing substantially all the relative movement between the inner and outer housings, and stop means cooperating between the outer housing and inner housing for limiting the longitudinal movement therebetween.

References Cited by the Examiner

UNITED STATES PATENTS

| | | | |
|---|---|---|---|
| 1,544,032 | 6/1925 | Potez | 267—63 |
| 1,548,050 | 8/1925 | Lord | 280—96.2 |
| 1,871,390 | 9/1932 | Reynolds | 267—63 |
| 1,970,208 | 8/1934 | Warner | 280—96.2 |
| 2,150,322 | 3/1939 | Garnett et al. | 280—96.2 |
| 2,193,881 | 3/1940 | Peglow | 280—96.2 |
| 2,237,855 | 4/1941 | Watson | 267—60 X |
| 2,252,789 | 8/1941 | Van Dorn | 267—63 X |
| 2,486,741 | 11/1949 | Gabriel | 267—63 |
| 2,574,420 | 11/1951 | Seddon | 267—63 |
| 2,670,200 | 2/1954 | Seddon | 267—63 |
| 2,687,898 | 8/1954 | Schwinn | 267—60 X |
| 2,724,588 | 11/1955 | Sheets | 267—63 X |
| 2,743,102 | 4/1956 | Seddon | 267—63 |
| 2,767,977 | 10/1956 | Paton | 267—63 X |
| 2,782,051 | 2/1957 | Smith | 267—60 X |
| 2,859,978 | 2/1958 | Brimhall | 267—63 X |
| 2,960,350 | 11/1960 | Broughton et al. | 267—63 X |

FOREIGN PATENTS 974,288   2/1963   Great Britain.

KENNETH H. BETTS, *Primary Examiner.*